(12) United States Patent
Allert

(10) Patent No.: US 12,074,473 B2
(45) Date of Patent: Aug. 27, 2024

(54) CHANGEOVER DEVICE, RETROFIT KIT AND METHOD FOR SUPPLYING ELECTRICAL POWER TO A LOAD

(71) Applicant: SMA Solar Technology AG, Niestetal (DE)

(72) Inventor: Claus Allert, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 17/866,741

(22) Filed: Jul. 18, 2022

(65) Prior Publication Data
US 2022/0352747 A1   Nov. 3, 2022

Related U.S. Application Data

(63) Continuation of application No. PCT/EP2020/086201, filed on Dec. 15, 2020.

(51) Int. Cl.
| | |
|---|---|
| *H02J 9/06* | (2006.01) |
| *H02J 3/00* | (2006.01) |
| *H02J 3/32* | (2006.01) |

(52) U.S. Cl.
CPC ............ *H02J 9/063* (2020.01); *H02J 3/0073* (2020.01); *H02J 3/32* (2013.01); *H02J 2207/20* (2020.01); *H02J 2300/24* (2020.01)

(58) Field of Classification Search
CPC .. H02J 9/063; H02J 3/0073; H02J 3/32; H02J 2207/20; H02J 2300/24
USPC .......................................................... 307/66
See application file for complete search history.

(56) References Cited

U.S. PATENT DOCUMENTS

| | | | | |
|---|---|---|---|---|
| 10,008,878 | B2* | 6/2018 | Satake | .................... H02J 9/061 |
| 2018/0048309 | A1* | 2/2018 | Vogt, IV | ................ H04B 3/548 |

FOREIGN PATENT DOCUMENTS

| | | |
|---|---|---|
| DE | 202010008123 U1 | 10/2010 |
| DE | 102012102766 B3 | 9/2013 |
| DE | 102012011708 A1 | 12/2013 |

OTHER PUBLICATIONS

International Search Report dated Apr. 1, 2021 in connection with PCT/EP2020/086201.

* cited by examiner

*Primary Examiner* — Daniel Kessie
*Assistant Examiner* — Dru M Parries
(74) *Attorney, Agent, or Firm* — Eschweiler & Potashnik, LLC (57) ABSTRACT

A changeover device for selectively supplying power to at least one load from a grid or a bidirectional inverter includes an input having a grid neutral conductor connection and a grid phase conductor connection for connection to the grid. The changeover device further includes a first output having an inverter neutral conductor connection and an inverter phase conductor connection for connecting the bidirectional inverter, a second output having a load neutral conductor connection and a load phase conductor connection for connecting the load and a switching circuit, the actuator of which is connected to an actuator input of the changeover device. The switching circuit includes a first and a second normally closed contact and a normally open contact that are connected in an interconnection to the grid phase conductor connection, the inverter phase conductor connection, and the load phase conductor connection. An associated method is also disclosed.

20 Claims, 4 Drawing Sheets

CHANGEOVER DEVICE, RETROFIT KIT AND METHOD FOR SUPPLYING ELECTRICAL POWER TO A LOAD

CROSS REFERENCE TO RELATED APPLICATIONS

This application is a continuation of International Patent Application Number PCT/EP2020/086201, filed on Dec. 15, 2020, which claims priority to German Patent Application number 10 2020 101 002.8, filed on Jan. 16, 2020, and is hereby incorporated by reference in its entirety.

FIELD

The disclosure relates to a changeover device for selectively supplying power to a load from a higher-level distribution grid or from a local energy supply system. The local energy supply system comprises an inverter that has a voltage-setting function and is capable of establishing a local island grid. The disclosure also relates to a retrofit kit for a local energy supply system comprising a changeover device and a method for changing over an energy supply for a load.

BACKGROUND

The disclosure relates to what are known as emergency power systems, backup power systems or backup systems that protect grid-tied energy supply systems in the event of a grid failure. That is, systems are described that can continue to supply at least some of the connected loads with power, for example according to predetermined priorities, in the event of a grid failure. To this end, a series of switching operations have to be carried out, for example grid disconnection, starting up a grid former and connecting said grid former to the supply lines. Furthermore, the state of the grid has to be monitored to initiate synchronization of the local generators and to be able to reconnect the system to the grid, for example, when the grid returns. These and many other requirements have to be met, the meeting of which is regulated in different countries with a wide variety of directives, norms and standards.

Furthermore, the disclosure relates to relatively small backup power systems which are only intended to supply power to a few loads. Backup power systems of this kind are used in particular in grids that have a high level of stability, which means that they guarantee the supply of power to the loads without disruption more than 90% of the time. Conversely, this means that backup power systems provided in this way are kept permanently ready for operation, but are only used very rarely. The backup power system, usually the inverter contained therein, generally comprises a controller that both monitors the state of the grid and actuates the switches for changing over from grid operation to backup power operation.

The document DE 102012011708 A1 discloses an inverter device having at least one inverter unit that can be connected to a regenerative energy source and to a rechargeable battery device and, via a connecting apparatus, to a cable run between a public energy grid and consumers. The inverter unit is assigned a control unit that interacts with a power meter to measure the voltage present on the public energy grid. The inverter unit is assigned a safety circuit, comprising a first switch apparatus between the connecting apparatus and the public energy grid, and a second switch apparatus between the inverter unit and the connecting apparatus. If the public energy grid fails, the control unit switches the first and the second switch apparatus to a disconnecting state and then connects the inverter unit, which is switched to a voltage-controlled mode, by way of the second switch apparatus to the consumers to supply them with emergency power.

SUMMARY

Switches that are open in the idle state (what are known as normally open switches) or switches that are closed in the idle state (what are known as normally closed switches) can be used for the changeover.

Figure 1:
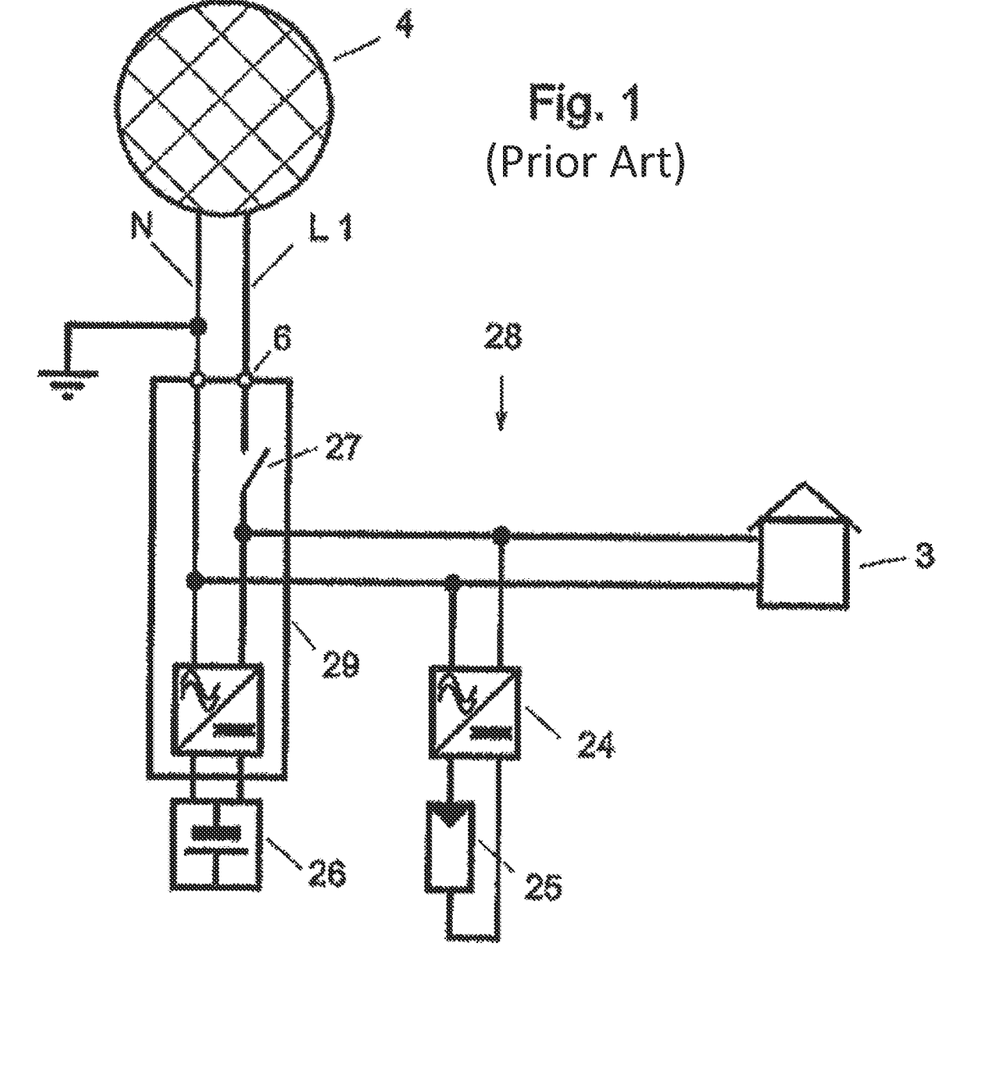
FIG. 1 shows a schematic illustration of a local energy supply system according to the prior art.

For safety reasons, switches that are open in the idle state are usually used, often integrated into the inverter as shown in FIG. 1. However, this solution has the disadvantage that in stable grids, this switch has to be actively kept closed 98% or more of the time, which incurs a considerable energy requirement. In addition, the switch in this configuration has to be designed for the full current-carrying capacity of all connected loads, wherein the switch still has to function safely even in the event of a short circuit.

These requirements make the known configuration shown in FIG. 1 complex and expensive. This is all the more significant in small systems, where, for example, only one consumer needs to be protected in the event of a grid fault, which moreover occurs only extremely rarely.

There is therefore a need for changeover devices for backup power systems, in particular in stable grids, which can be designed to be small and inexpensive and also incur low costs in standby mode. It is therefore an object of the present disclosure to present a changeover device that is designed to be compact and not very complex, is inexpensive to maintain and can also be subsequently inserted into existing installations.

A changeover device according to the disclosure is used to selectively supply power to at least one load from a grid or from a bidirectional inverter. A battery or a fuel cell, for example, can be connected to the bidirectional inverter and said inverter can be equipped with a voltage-setting function, i.e. it can be capable of establishing a local island grid. The changeover device according to the disclosure comprises an input having a grid neutral conductor connection and a grid phase conductor connection for connection to the grid, a first output having an inverter neutral conductor connection and an inverter phase conductor connection for connecting an inverter output of the bidirectional inverter, and a second output having a load neutral conductor connection and a load phase conductor connection for connecting the load. Furthermore, the changeover device according to the disclosure comprises a switching circuit, the actuator of which is connected to an actuator input of the changeover device. The switching circuit comprises a first and a second normally closed contact and a normally open contact, wherein the first normally closed contact has a first grid-side connection and a first inverter-side connection and the second normally closed contact has a second grid-side connection and a first load-side connection and the normally open contact has a second inverter-side connection and a second load-side connection. The grid phase conductor connection is connected to the first grid-side connection and the second grid-side connection, and the inverter phase conductor connection is connected to the first inverter-side connection. Furthermore, the load phase conductor connection is connected to the first load-side connection and the second load-side connection.

In one embodiment the changeover device can—but does not necessarily have to—additionally comprise a Secure Power Supply (SPS) connection having an SPS neutral conductor connection and an SPS phase conductor connection for connection to a Secure Power Supply (SPS) output of the inverter. The SPS connection of the changeover device is therefore typically present when an inverter is intended to be connected to the changeover device, the inverter itself providing an SPS output. If the changeover device comprises the additional SPS connection, the second inverter-side connection can be connected to the SPS phase conductor connection. There is no provision here for the second inverter-side connection to be connected to the inverter phase conductor connection within the changeover device.

By way of the optionally present SPS connection of the changeover device, the changeover device according to the disclosure can be operated both on inverters that have their own SPS output and on inverters that do not have such an SPS output. In the first case, the changeover device has the optional SPS connection, while in the latter case it is typically not present. The changeover device according to the disclosure can therefore be used irrespective of whether or not the inverter itself has an SPS output. This takes account of the fact that, at present, both inverters that have their own SPS output and inverters that do not have their own SPS output are available.

When an inverter having an SPS output is connected to the grid via its inverter output, its SPS output is voltage-free. In contrast, when the inverter, with its inverter output, is disconnected from the grid, an AC voltage provided by a DC-to-AC converter of the inverter is present at the SPS output of said inverter. By way of example, relatively small local loads are usually connected to the SPS output of the inverter. The local loads can continue to be supplied with power via the SPS output of the inverter even in the event of a grid failure, for example from a battery connected to the inverter on the DC side or from a fuel cell. In the present case, the SPS output of the inverter is not connected directly to the load, but to the load with the interposition of the changeover device.

In one embodiment in which the changeover device does not comprise the additional SPS connection, the second inverter-side connection of the changeover device can be connected to the inverter phase conductor connection of the changeover device.

If the changeover device does not have an additional SPS connection and all-pole disconnection in the event of a grid fault is not prescribed by standards, the neutral conductor connection can be connected directly to the load neutral conductor connection and the inverter neutral conductor connection. If, in contrast, the changeover device has the additional SPS connection, in one embodiment the grid neutral conductor connection is connected directly to the inverter neutral conductor connection, the load neutral conductor connection and to the SPS neutral conductor connection of the changeover device if all-pole disconnection in the event of a grid fault is not prescribed by standards. In these cases, the changeover device according to the disclosure manages with only three contacts, which are available integrated in conventional, inexpensive relays or contactors.

Figure 3:
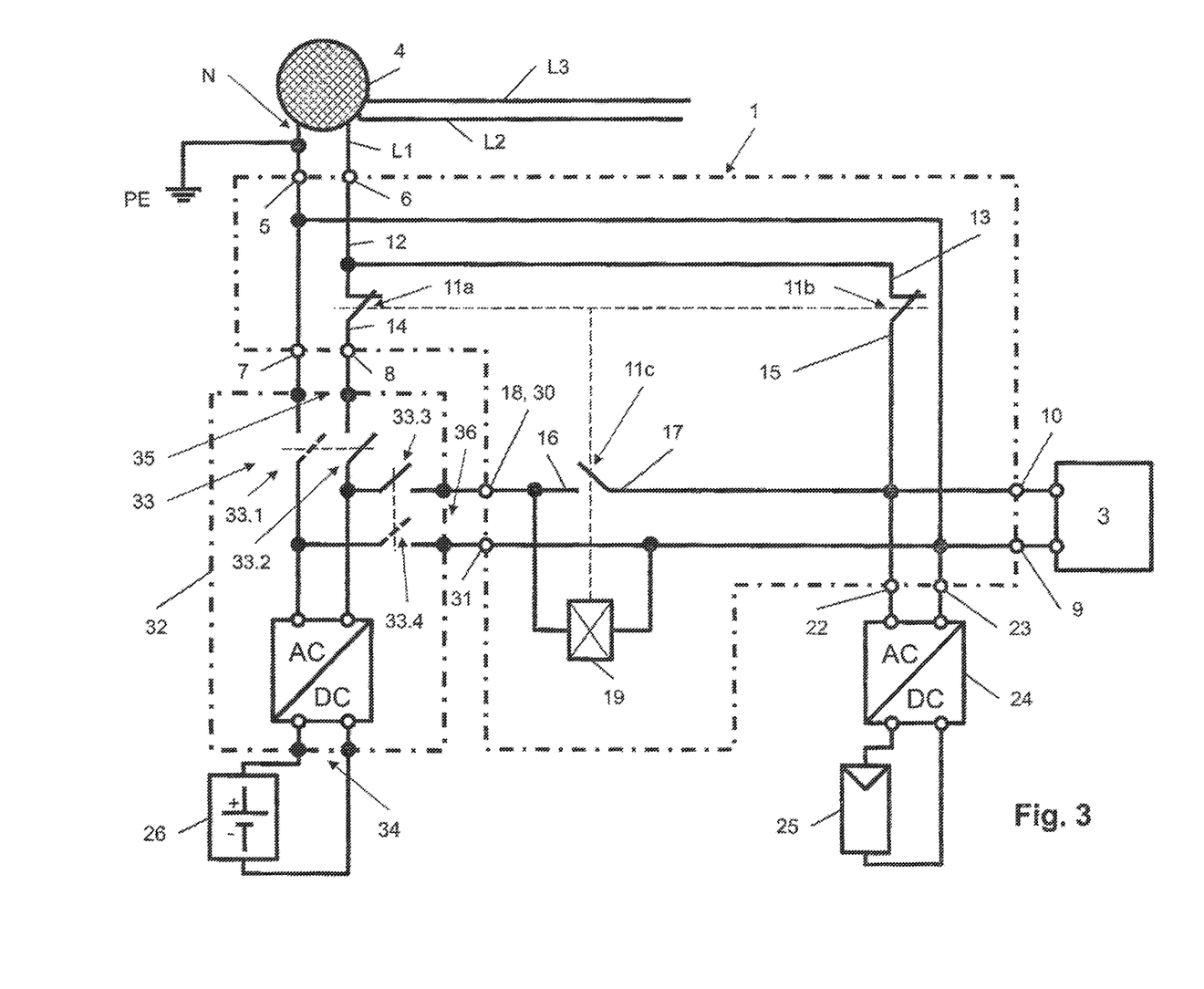
FIG. 3 shows an example configuration of a second embodiment of a changeover device, according to the disclosure, with connected components.

If the changeover device comprises the additional SPS connection, the actuator input of the changeover device can, in one embodiment, be designed identically to or be identical to the SPS phase conductor connection of the changeover device (i.e., connections 18 and 30 of FIG. 3 are the same connection). In this case, the actuator of the changeover device can be connected with its first connection to the SPS phase conductor connection and with its other connection to the SPS neutral conductor connection of the changeover device. In such an embodiment, an actuation signal present at the actuator input—and therefore likewise at the SPS phase conductor connection—can simultaneously provide a voltage supply for the actuator of the switching circuit of the changeover device. This is described in detail in connection with FIG. 3.

The changeover device according to the disclosure with the two normally closed contacts and the one normally open contact does not require an energy supply in the event that the power can be supplied from the higher-level distribution grid. In the de-energized (non-switched) basic state of the switching circuit, the supply of power for the consumers from the grid is guaranteed by way of the second normally closed contact, and the inverter is connected to the grid by way of the first normally closed contact. Only if the higher-level grid fails and the consumers connected to the changeover device are to be supplied with power by the inverter also connected to the changeover device, the switching circuit is energized, meaning that the normally closed contacts are opened and the normally open contact is closed. These switching operations create a local grid that is separate from the higher-level grid and in which the inverter can supply power to the connected loads. This means that the changeover device or the switching circuit thereof only consumes energy in the rare event of a grid fault or a grid failure. The changeover device according to the disclosure is therefore more energy-efficient and more cost-effective overall than previously known changeover devices.

An additional advantage results from the use of normally closed contacts for disconnection from the higher-level grid. In the solution that is common in the prior art, as outlined in FIG. 1, the normally open circuit breaker can no longer be actuated in the event of a fault in the inverter and is therefore opened. As a result, the loads are not supplied with power even if the distribution grid is functioning correctly. Using the changeover device according to the disclosure, there can be no disconnection in the event of a fault in the inverter if there is a grid failure, and naturally also no emergency power supply by the inverter. If the grid is stable, however, the loads can continue to be supplied with power, since the normally closed contacts do not require any actuation to remain closed.

In a method according to the disclosure for changing over an energy supply for a load by means of a changeover device according to the disclosure, the connected bidirectional inverter ascertains a grid state and, in the event of a critical grid state, provides an actuation signal for the actuator input, with the result that the switching circuit is activated and, as a result, the normally closed contacts are opened and the normally open contact is closed. The connected bidirectional inverter then starts up and provides a voltage at its inverter phase conductor connection or—if the inverter itself comprises an SPS output—at its SPS output, which voltage is output via the normally open contact, which is now closed, to the load phase conductor connection and to the connected loads.

A critical grid state is to be understood here to mean all states that do not allow the connected loads to function correctly.

By way of example, the switching circuit can be in the form of a relay, but it can also be a contactor with or without checkback contacts. The switching contacts can be integrated in a switching circuit or divided between a plurality of individually actuable switching circuits.

The actuator input of the changeover device according to the disclosure can be connected to the bidirectional inverter, with the result that the actuator of the switching circuit can be triggered directly by the inverter. This is advantageous if the connected inverter also monitors the grid state. In principle, the grid state can also be monitored by another external controller that actuates the switching circuit in the event of a critical grid state and instructs the connected inverter to start up and form a local island grid.

In one embodiment of the method in which the changeover device has an additional SPS connection, a voltage supply for the actuator of the switching circuit can be provided by way of the actuation signal.

Due to the compact design of the changeover device, it can be designed for installation in a distribution box of a domestic installation or for installation in an inverter housing.

In a further embodiment, the changeover device also has energy supply connections for connecting a further energy source. The further energy source can, in one embodiment, be a renewable local energy source, such as a photovoltaic system installed on site. Alternatively or additionally, other local energy sources can be integrated into the local installation via the changeover device according to the disclosure and can additionally feed into the local island grid in the event of a grid fault.

In one embodiment, the changeover device is part of a retrofit kit with which a system can be upgraded to supply power to a load in the event of a critical grid state. In this case, the system comprises feed lines to the load that is to be supplied with power. By interposing the changeover device in the feed lines to the load and connecting a bidirectional inverter having a voltage-setting function to the changeover device, an emergency power supply for a load can be subsequently installed in a simple, compact and cost-effective manner. A further advantage of the changeover device according to the disclosure in this case proves to be that, by designing said changeover device as a compact unit separate from the inverter, the dimensioning of the current-carrying capacity of the switches contained therein can be selected to suit the system or the loads to be supplied with power and can even be subsequently modified without great effort.

BRIEF DESCRIPTION OF THE FIGURES

The disclosure is described below on the basis of example embodiments using drawings from which, in joint consideration with the features of the claims, further features, properties and advantages of the disclosure emerge.

In the drawings.

DETAILED DESCRIPTION

FIG. 1 shows a local energy supply system having an inverter 29 and a battery 26 connected thereto, as is known in the prior art. A phase conductor of a higher-level grid 4 is connected to a grid phase conductor connection 6. A switch 27 is integrated into the inverter 29 and is used to disconnect the phase conductor. In the event of a grid fault, the switch 27 is opened and the loads 3, a local energy source 24/25 and the inverter 29 with connected battery 26 are disconnected from the grid 4. The inverter 29 can establish a local grid and supply power to the loads 3. The local energy source consisting of a generator 25 with an inverter 24 can switch on and feed energy into the local grid 28.

The switch 27 is in the form of a normally open switch, which means that energy has to be expended to keep this switch 27 closed at all times that the grid 4 is available without disruption. Even in cases in which the grid 4 is available without disruption but the inverter 29 would not be functional, the switch 27 is opened and the loads 3 are therefore not supplied with power. This is disadvantageous, in particular in very stable grids 4.

In addition, the entire current flows from the grid to the battery 26 and vice versa, from the photovoltaic generator 25 to the grid 4 and from the grid 4 to the loads 3 via the switch 27, which must therefore be designed for the maximum possible current. This can lead to very powerful and therefore expensive switches having to be used here.

Figure 2:
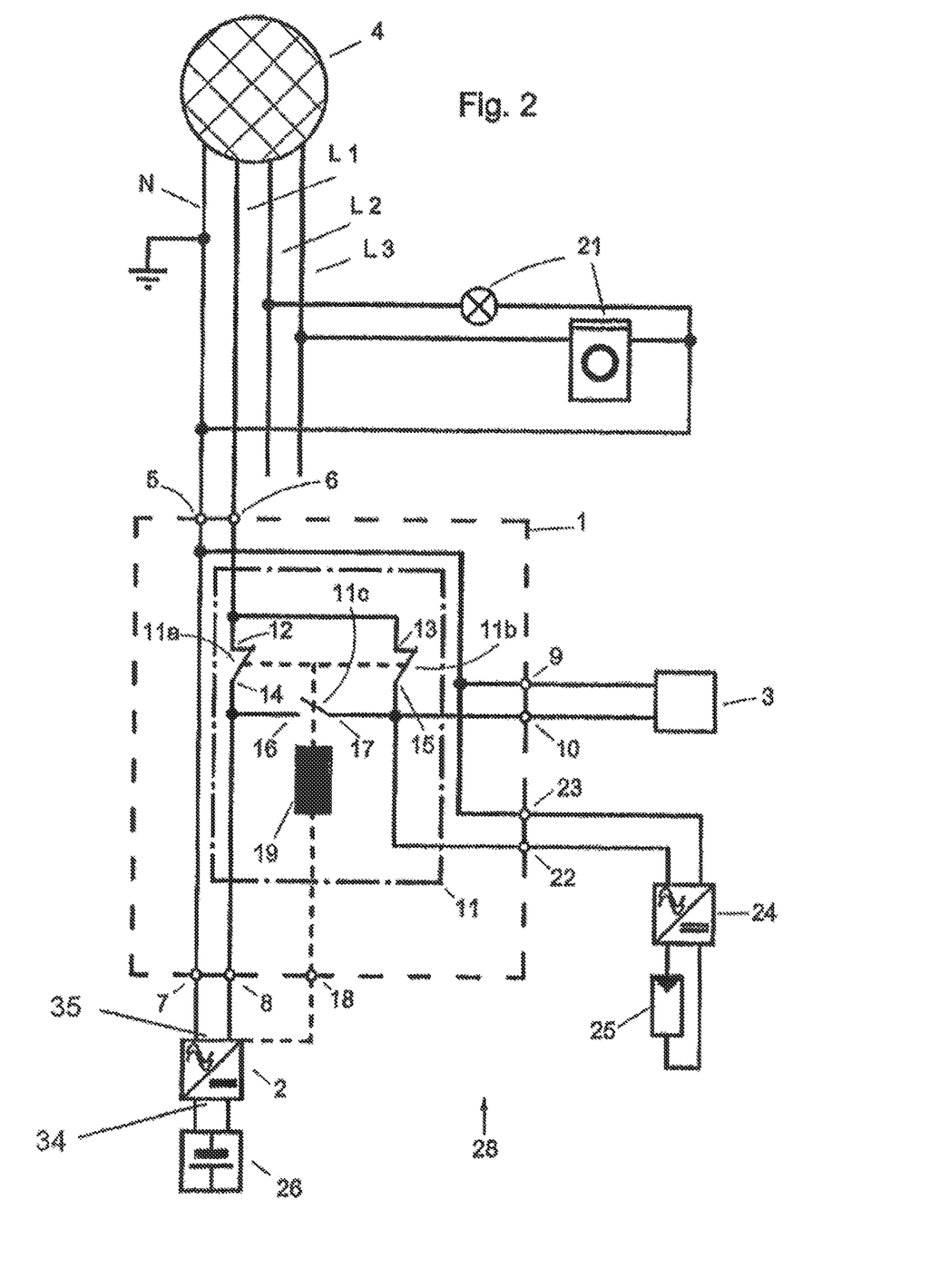
FIG. 2 shows an example configuration of a first embodiment of a changeover device, according to the disclosure, with connected components.

FIG. 2 shows a first embodiment of a changeover device 1 according to the disclosure. The energy supply grid 4 is in the form of a three-phase grid with phase conductors L1, L2, L3 and a neutral conductor N. By way of example, only the phase conductor L1 and the neutral conductor N are connected to the input of the changeover device 1 at a grid phase conductor connection 6 (e.g., a terminal) and a grid neutral conductor connection 5 (e.g., a terminal). Further loads 21, which are, however, at least not supplied with power by way of the changeover device 1 in the event of a grid failure, can be connected to the phase conductors L2, L3.

A bidirectional inverter 2 is connected to a first output of the changeover device 1 at an inverter neutral conductor connection 7 and an inverter phase conductor connection 8. A battery 26 is connected to the bidirectional inverter 2. The battery 26 can be charged from the grid 4 and/or from a local energy source, in this case a photovoltaic generator 25.

A load 3 is connected to a second output of the changeover device 1 at a load neutral conductor connection 9 and a load phase conductor connection 10. The load 3 can comprise a plurality of partial loads, e.g. individual consumers, and should continue to be supplied with power in the event of a grid fault or a grid failure.

In the example, a further energy source, which comprises a PV inverter 24 and a photovoltaic generator 25, is connected to a PV phase conductor connection 22 and a PV neutral conductor connection 23.

The changeover device 1 has a switching circuit 11 with two normally closed contacts 11a, 11b and one normally open contact 11c. The first normally closed contact 11a has a first grid-side connection 12 and a first inverter-side connection 14, the second normally closed contact 11b has a second grid-side connection 13 and a first load-side connection 15 and the normally open contact 11c has a second inverter-side connection 16 and a second load-side connection 17. The phase conductor connection 6 is connected to the first grid-side connection 12 and the second grid-side connection 13, the inverter phase conductor connection 8 is connected to the first inverter-side connection 14 and the second inverter-side connection 16 and the load phase conductor connection 10 is connected to the first load-side connection 15 and the second load-side connection 17. In one embodiment, the neutral conductor connection 5 is connected directly to the load neutral conductor connection 9, the inverter neutral conductor connection 7 and the PV neutral conductor connection 23, which constitutes a possible embodiment of particularly low complexity in many countries whose standards do not require all-pole disconnection from the grid 4. As a result, the switching circuit 11 only requires three contacts.

An actuator 19 of the switching circuit 11 is connected to an actuator input 18 of the changeover device 1. An actuation signal can be applied to the actuator input, with the result that the switching circuit 11 is activated, that is to say the normally closed contacts are opened and the normally open contact is closed. A controller (not shown) that in one embodiment can be located in the connected inverter 2 ascertains, by means of sensors (not shown in FIG. 2) attached, for example, to the phase conductor connection 6, a grid state and provides the actuation signal for the actuator input 18 in the event of a critical grid state. As a result, the normally closed contacts 11a, 11b are opened and the connection of the phase conductor connection 6 to the phase conductor connections 8, 9 and 22 is interrupted. At the same time or slightly delayed thereafter, the normally open contact 11c closes, with the result that the inverter phase conductor connection 8 is connected to the load phase conductor connection 10. The inverter 2 starts up in voltage-setting operation and provides a local grid 28 that is suitable for supplying power to the load 3. The PV inverter 24 is also connected to the second load-side connection 17 via its phase conductor connection 22, identifies the returning grid (provided by the inverter 2), synchronizes with it and can then feed into the local grid 28. This additional energy can supply power to connected loads 3 and can also be fed into the battery 26.

In one embodiment, the changeover device 1 can also contain energy meters (not shown), which record the respective energy flows at the phase conductor connections 6, 8, 9 and 22 and forward them to a controller (not shown) that processes and/or likewise forwards these data.

The changeover device 1 can be used in one embodiment in feed lines L1 and N of an existing installation to a load 3 by the feed lines being separated and connected to the phase conductor connections 5, 6 and 9, 10 of the changeover device 1. It is therefore possible to add a backup or emergency power function to an existing installation. Since the changeover device 1 can be designed to be small and compact, it can be integrated into a domestic distribution box, for example. New lines may have to be laid only to connect the inverter 2. Retrofitting with a local energy source, which comprises a PV inverter 24 and a photovoltaic generator 25, for example, is also easily possible.

FIG. 3 shows a second embodiment of the changeover device 1, according to the disclosure, with components connected thereto. The second embodiment is similar in many respects to the first embodiment of the changeover device 1 already shown in FIG. 2. For the similar aspects, reference is therefore made to the description of FIG. 2. The differences of the second embodiment from the first embodiment of the changeover device 1 are mainly presented below.

Bidirectionally operating inverters 2 having what is known as a Secure Power Supply (SPS) function are also known as battery inverters. In FIG. 3, the inverter 2 connected to the battery 26 is in the form of an inverter of this kind with an SPS function. In accordance with the inverter 2 from FIG. 2, the inverter 2 having an SPS function in FIG. 3 comprises a battery connection 34 for connecting the battery 26 and a grid connection 35 for connecting an energy supply grid 4. Similarly to the first embodiment in FIG. 2, in the second embodiment the grid connection 35 of the inverter 32 is electrically connected to the energy supply grid 4 via the changeover device 1, for example, via the first inverter-side connection 7, 8 and the input 5, 6 of the changeover device 1. Additionally, the inverter 32 however also comprises what is known as an SPS output 36 for supplying power to one or more local loads in the event of a failure of the energy supply grid.

In one embodiment, the inverter 32 having an SPS function comprises two operating modes in its operation. In a first operating mode (grid operation), which is assumed when the energy supply grid 4 is operating properly, power can be exchanged between the battery connection 34 and the grid connection 35. In contrast, the SPS output 36 is galvanically isolated from both the grid connection 35 and the battery connection 34. In contrast to the first operating mode, in a second operating mode (back-up operation), a power exchange between the battery connection 34 and the SPS output 36 is made possible, while the grid connection 35 is galvanically isolated from both the battery connection 34 and the SPS output 36. The inverter 32 having an SPS function is now able to disconnect its grid connection 35 from the grid 4 in the event of a grid failure and to provide an AC voltage, supplied via the battery, at its SPS output 36.

To implement the SPS function, in one embodiment the inverter 32 can have a switching circuit 33 with four switching contacts 33.1-33.4 that are coupled to one another and connect a DC-to-AC converter of the inverter 32 either to the grid connection 35 of the inverter 32 or to the SPS connection 36 of the inverter 32. The coupling of the switching contacts 33.1-33.4 to one another is symbolized in FIG. 3 by a dashed line. Specifically, of the four switching contacts 33.1-33.4 of the switching device 33, a first switching contact 33.1 and a second switching contact 33.2 are configured to connect or disconnect the DC-to-AC converter of the inverter 32 to or from the grid connection 35, while a third switching contact 33.3 and a fourth switching contact 33.4 are configured to connect or disconnect the DC-to-AC converter to or from the SPS output 36 of the inverter 2. In one embodiment, the first switching contact 33.1 and the second switching contact 33.2 are coupled to one another in the same direction, that is to say they close or open together. The third switching contact 33.3 and the fourth switching contact 33.4 are also coupled to one another in the same direction. In contrast, the first switching contact 33.1 and the third switching contact 33.3 can be inversely coupled to one another. For example, if the first switching contact 33.1 closes, the third switching contact 33.3 can open at the same time on account of the inverse coupling. The same inverse coupling can also be present between the second switching contact 33.2 and the fourth switching contact 33.4. Usually, only one pair out of the two pairs of switching contacts 33.1-33.4 is closed during operation, while the other pair of switching contacts 33.1-33.4 is open. In addition, a state is also possible in which both pairs of switching contacts 33.1, 33.2 and 33.3, 33.4 are open.

In addition to the connections already shown in FIG. 2, the changeover device 1 in the second embodiment now comprises an SPS phase conductor connection 30 and an SPS neutral conductor connection 31. The SPS phase conductor connection 30 and the SPS neutral conductor connection 31 are each connected to their corresponding conductor connections of the SPS connection 36 of the inverter 32. The load neutral conductor connection 9 is connected to the SPS neutral conductor connection 31. The load phase conductor connection 10 is connected to the SPS phase conductor connection 30 via the normally open contact 11c of the switching circuit 11. The actuator 19 of the switching circuit 11 is connected with a first connection to the SPS phase conductor connection 30 and with a second connection to the SPS neutral conductor connection 31.

Operation of the changeover device 1 is now as follows. In one embodiment, the grid state can be monitored by the controller of the inverter 32 (not shown explicitly in FIG. 3). If the grid 4 is operating properly, the first switching contact 33.1 and the second switching contact 33.2 of the switching device 33 are kept closed by the controller of the inverter 32. The third switching contact 33.3 and the fourth switching contact 33.4, however, remain open. The SPS output 36 of the inverter 32 is therefore voltage-free. On account of this, the actuator 19 of the switching circuit 11 is also voltage-free, which is why the normally closed contacts 11a, 11b of the switching circuit 11 are closed and the normally open contact 11c is open. The grid connection 35 of the inverter 32 is therefore connected to the grid 4 via the closed first 33.1 and second contact 33.2 of the inverter 32 and via the normally closed contact 11a of the changeover device 1. Power can be exchanged between the battery 26 and the grid 4 and also between the PV generator 25 and the grid 4. The load 3 connected to the changeover device 1 is supplied with power via the grid 4.

A failure of the grid 4 is identified by the controller of the inverter 32. Said controller then opens the first switching contact 33.1 and the second switching contact 33.2 of the inverter 32 and closes the third switching contact 33.3 and fourth switching contact 33.4. The inverter 32 therefore disconnects its grid connection 35 from the first output of the changeover device 1 having the inverter neutral conductor connection 7 and the inverter phase conductor connection 8, and therefore from the grid 4. A voltage that is supplied from the battery 26 is provided at the SPS output 36 of the inverter 32 by the DC-to-AC converter. The voltage present at the SPS output 36 of the inverter 32 is also present at the SPS connection 30, 31 of the changeover device 1, and therefore at the actuator 19 of the switching circuit 11 of the changeover device 1. In response to this, the actuator 19 closes the normally open contact 11c and opens the normally closed contacts 11a, 11b of the changeover device 1. Consequently, the load 3 connected to the load connection 9, 10 of the changeover device 1 is supplied with power from the battery 26 via the inverter 32 and from the PV generator 25 via the PV inverter 24.

The second embodiment of the changeover device 1 can be used in conjunction with an inverter 32 that comprises an SPS function and a corresponding SPS output 36. In the event of a grid failure, the inverter 32 is disconnected from the grid 4 and, on account of its SPS function, additionally provides a voltage at its SPS output 36. The voltage of the SPS connection 36 of the inverter is transferred to the changeover device 1 at the SPS connection 30, 31 thereof and therefore serves as an actuation signal for the actuator 19 of the switching circuit 11. The actuation signal signals the failure of the grid 4 to the actuator 19 and additionally also serves as a supply voltage for the actuator 19 of the switching circuit 33. Therefore, the SPS phase conductor connection 31 also simultaneously forms the actuator input 18 of the changeover device 1. A separate actuator input of the changeover device 1 can be omitted here.

The description of FIG. 3 was given as an example for the case that the switching circuit 33 of the inverter 32 provides all-pole disconnection between the DC-to-AC converter and the inverter output 35, and between the DC-to-AC converter and the SPS output 36 of the inverter. For this reason, the switching circuit 33 comprises the four switching contacts 33.1-33.4. If all-pole disconnection is not required, the first switching contact 33.1 and the fourth switching contact 33.4 of the inverter 32 can be omitted, however, and replaced in one embodiment by an inseparable (i.e. non-switchable) connection. In order to symbolize this, the first switching contact 33.1 and the fourth switching contact 33.4 are each shown using dashed lines in FIG. 3.

Figure 4:
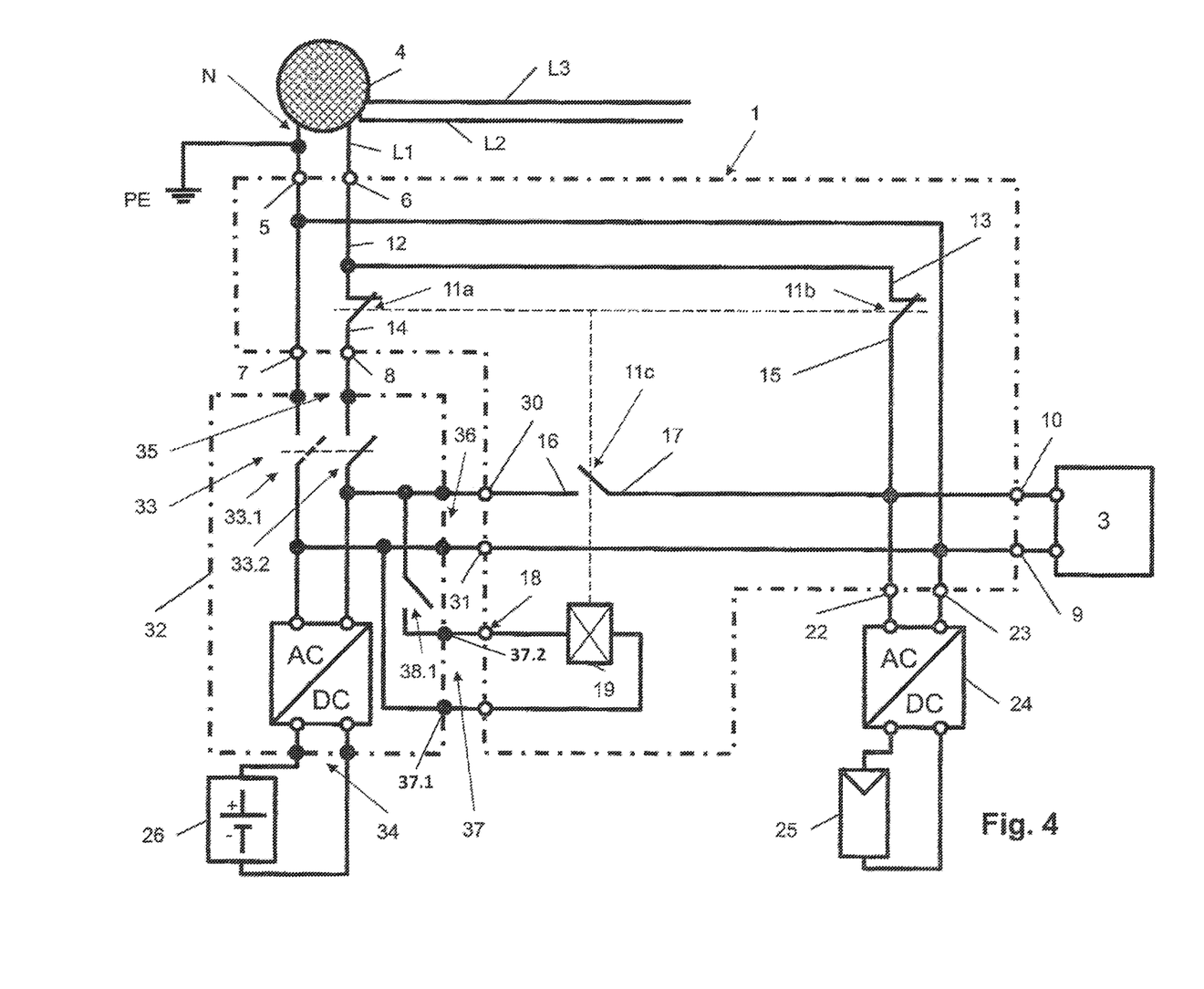
FIG. 4 shows an example configuration of a third embodiment of a changeover device, according to the disclosure, with connected components.

FIG. 4 shows a third embodiment of the changeover device 1, which is similar to the second embodiment in FIG. 3. Here, too, reference is made to the similar points in the description of FIG. 3. The third embodiment according to FIG. 4 differs from the second embodiment shown in FIG. 3 in that the SPS output 36 is connected directly, i.e. in particular without the interposition of the third 33.3 and fourth switching contact 33.4, to a bridge output of the DC-to-AC converter assigned to the inverter 32.

In order to output the actuation signal to the changeover device 1, the inverter 32 according to FIG. 4 has an additional connection 37 with a neutral conductor connection 37.1 and a phase conductor connection 37.2. The additional phase conductor connection 37.2 is connected to the bridge output of the inverter 32 with the interposition of an additional switching contact 38.1. Furthermore, the additional connection 37 is connected to the two-pole actuator input 18 of the changeover device 1.

During operation of the changeover device, when a failure of the grid 4 is identified, the connection of the inverter 32 to the grid 4 is first disconnected by opening the first switching contact 33.1 and the second switching contact 33.2. In addition, an actuation signal for the changeover device 1 is output at the additional connection 37 of the inverter 32 by closing the additional switching contact 38.1. The actuation signal is also present at the actuator input 18, connected to the additional connection 37 of the inverter 32, of the changeover device 1. The actuation signal signals the failure of the grid 4 to the changeover device 1 and at the same time provides a supply voltage for the actuator 19 that then changes over the switching circuit 11. In particular, the normally closed contacts 11a and 11b of the switching circuit 11 are opened in this case. As a result, the grid phase conductor connection 8 is disconnected from the inverter phase conductor connection 8 of the changeover device 1 and, on the other hand, the energy supply connection 22 is disconnected from the grid phase conductor connection 8. Coupled to the normally closed contacts 11a, 11b, the normally open contact 11c is closed. In this case, the load phase conductor connection 10 is connected to the SPS phase conductor connection 30 of the changeover device 1, as a result of which the connection between the SPS output 36 of the inverter 32 and the load 3 is established.

Similarly to FIG. 3, the first switching contact 33.1 is also shown using dashed lines in FIG. 4 to symbolize that it is only required if all-pole disconnection is required, and otherwise it can be replaced by an inseparable connection.

What is claimed is:

1. A changeover device for selectively supplying power to at least one load from a grid or a bidirectional inverter, comprising:
   an input comprising a grid neutral conductor connection and a grid phase conductor connection, the input configured to connect to the grid;
   a first output comprising an inverter neutral conductor connection and an inverter phase conductor connection, the first output configured to connect to an inverter output of the bidirectional inverter;

a second output comprising a load neutral conductor connection and a load phase conductor connection, the second output configured to connect to the load;

a switching circuit, an actuator of which is connected to an actuator input of the changeover device, wherein the switching circuit comprises a first normally closed contact, a second normally closed contact, and a normally open contact, wherein the first normally closed contact has a first grid-side connection and a first inverter-side connection, the second normally closed contact has a second grid-side connection and a first load-side connection, and the normally open contact has a second inverter-side connection and a second load-side connection, wherein the grid phase conductor connection is connected to the first grid-side connection and the second grid-side connection, the inverter phase conductor connection is connected to the first inverter-side connection, and the load phase conductor connection is connected to the first load-side connection and the second load-side connection, wherein the changeover device additionally comprises a Secure Power Supply (SPS) connection having an SPS neutral conductor connection and an SPS phase conductor connection configured to connect to a Secure Power Supply (SPS) output of the bidirectional inverter, and wherein in an operating status of the changeover device only one of the inverter phase conductor connection and the SPS phase conductor connection is active and the other is voltage-free in response to switching circuitry within the bidirectional inverter, wherein in a first state of the switching circuitry solely the inverter phase conductor connection is voltage free and the SPS phase conductor connection is active, resulting in the actuator being actuated, and thus the first normally closed contact is open, the second normally closed contact is open, and the normally open contact is closed; and wherein in a second, different state of the switching circuitry solely the SPS phase conductor connection being voltage free and the inverter phase conductor connection is active, resulting in the actuator being not actuated, and thus the first normally closed contact is closed, the second normally closed contact is closed, and the normally open contact is open.

2. The changeover device as claimed in claim 1, wherein the second inverter-side connection is connected to the SPS phase conductor connection.

3. The changeover device as claimed in claim 1, wherein the grid neutral conductor connection is connected directly to the load neutral conductor connection and the inverter neutral conductor connection.

4. The changeover device as claimed in claim 2, wherein the grid neutral conductor connection is connected directly to the inverter neutral conductor connection, the load neutral conductor connection and to the SPS neutral conductor connection of the changeover device.

5. The changeover device as claimed in claim 2, wherein the actuator input is the same connection as the SPS phase conductor connection.

6. The changeover device as claimed in claim 1, wherein the switching circuit comprises a relay.

7. The changeover device as claimed in claim 1, wherein the first normally closed contact and the second normally closed contact and the normally open contact are integrated in one switching circuit.

8. The changeover device as claimed in claim 1, wherein the actuator input is connected to the bidirectional inverter.

9. The changeover device as claimed in claim 1, wherein the changeover device is configured for installation in a distribution box of a domestic installation.

10. The changeover device as claimed in claim 1, wherein the changeover device is integrated into the connected bidirectional inverter.

11. The changeover device as claimed in claim 1, further comprising energy supply connections configured to connect to a further energy source.

12. A retrofit kit for a system with feed lines to a load comprising a changeover device for selectively supplying power to at least one load from a grid or a bidirectional inverter, comprising:

an input comprising a grid neutral conductor connection and a grid phase conductor connection, the input configured to connect to the grid;

a first output comprising an inverter neutral conductor connection and an inverter phase conductor connection, the first output configured to connect to an inverter output of the bidirectional inverter;

a second output comprising a load neutral conductor connection and a load phase conductor connection, the second output configured to connect to the load;

a switching circuit, an actuator of which is connected to an actuator input of the changeover device, wherein the switching circuit comprises a first normally closed contact, a second normally closed contact, and a normally open contact, wherein the first normally closed contact has a first grid-side connection and a first inverter-side connection, the second normally closed contact has a second grid-side connection and a first load-side connection, and the normally open contact has a second inverter-side connection and a second load-side connection, wherein the grid phase conductor connection is connected to the first grid-side connection and the second grid-side connection, the inverter phase conductor connection is connected to the first inverter-side connection, and the load phase conductor connection is connected to the first load-side connection and the second load-side connection wherein the system is upgraded to supply power to the load from the inverter in the event of a critical grid state by interposing the changeover device in the feed lines to the load and connecting the bidirectional inverter, wherein the changeover device additionally comprises a Secure Power Supply (SPS) connection having an SPS neutral conductor connection and an SPS phase conductor connection configured to connect to a Secure Power Supply (SPS) output of the bidirectional inverter, and wherein in an operating status of the changeover device only one of the inverter phase conductor connection and the SPS phase conductor connection is active and the other is voltage-free in response to switching circuitry within the bidirectional inverter, wherein in a first state of the switching circuitry solely the inverter phase conductor connection is voltage free and the SPS phase conductor connection is active, resulting in the actuator being actuated, and thus the first normally closed contact is open, the second normally closed contact is open, and the normally open contact is closed; and wherein in a second, different state of the switching circuitry solely the SPS phase conductor connection being voltage free and the inverter phase conductor connection is active, resulting in the actuator being not actuated, and thus the first normally closed contact is closed, the second normally closed contact is closed, and the normally open contact is open.

13. A method for changing over an energy supply for a load using a changeover device for selectively supplying power to at least one load from a grid or a bidirectional inverter, comprising:

an input comprising a grid neutral conductor connection and a grid phase conductor connection, the input configured to connect to the grid;

a first output comprising an inverter neutral conductor connection and an inverter phase conductor connection, the first output configured to connect to an inverter output of the bidirectional inverter;

a second output comprising a load neutral conductor connection and a load phase conductor connection, the second output configured to connect to the load;

a switching circuit, an actuator of which is connected to an actuator input of the changeover device, wherein the switching circuit comprises a first normally closed contact, a second normally closed contact, and a normally open contact, wherein the first normally closed contact has a first grid-side connection and a first inverter-side connection, the second normally closed contact has a second grid-side connection and a first load-side connection, and the normally open contact has a second inverter-side connection and a second load-side connection, wherein the grid phase conductor connection is connected to the first grid-side connection and the second grid-side connection, the inverter phase conductor connection is connected to the first inverter-side connection, and the load phase conductor connection is connected to the first load-side connection and the second load-side connection wherein the connected bidirectional inverter ascertains a grid state and, in the event of a critical grid state, provides an actuation signal at the actuator input, with the result that the switching circuit is activated and, as a result, the first and second normally closed contacts are opened and the normally open contact is closed, wherein the changeover device additionally comprises a Secure Power Supply (SPS) connection having an SPS neutral conductor connection and an SPS phase conductor connection configured to connect to a Secure Power Supply (SPS) output of the bidirectional inverter, and wherein in an operating status of the changeover device only one of the inverter phase conductor connection and the SPS phase conductor connection is active and the other is voltage-free in response to switching circuitry within the bidirectional inverter, wherein in a first state of the switching circuitry solely the inverter phase conductor connection is voltage free and the SPS phase conductor connection is active, resulting in the actuator being actuated, and thus the first normally closed contact is open, the second normally closed contact is open, and the normally open contact is closed; and wherein in a second, different state of the switching circuitry solely the SPS phase conductor connection being voltage free and the inverter phase conductor connection is active, resulting in the actuator being not actuated, and thus the first normally closed contact is closed, the second normally closed contact is closed, and the normally open contact is open.

14. The method for changing over an energy supply for a load as claimed in claim 13, wherein a voltage supply for the actuator of the switching circuit is provided by way of the actuator signal.

15. A changeover device for selectively supplying power to at least one load from a grid or a bidirectional inverter, comprising:

an input comprising a grid neutral conductor connection and a grid phase conductor connection, the input configured to connect to the grid;

a first output comprising an inverter neutral conductor connection and an inverter phase conductor connection, the first output configured to connect to an inverter output of the bidirectional inverter;

a second output comprising a load neutral conductor connection and a load phase conductor connection, the second output configured to connect to the load;

a switching circuit, an actuator of which is connected to an actuator input of the changeover device, wherein the switching circuit comprises a first normally closed contact, a second normally closed contact, and a normally open contact, wherein the first normally closed contact has a first grid-side connection and a first inverter-side connection, the second normally closed contact has a second grid-side connection and a first load-side connection, and the normally open contact has a second inverter-side connection and a second load-side connection, wherein the grid phase conductor connection is connected to the first grid-side connection and the second grid-side connection, the inverter phase conductor connection is connected to the first inverter-side connection, and the load phase conductor connection is connected to the first load-side connection and the second load-side connection, wherein the changeover device additionally comprises a Secure Power Supply (SPS) connection having an SPS neutral conductor connection and an SPS phase conductor connection configured to connect to a Secure Power Supply (SPS) output of the bidirectional inverter, wherein in an operating status of the changeover device only one of the first output and the actuator input is active and the other is voltage-free in response to switching circuitry within the bidirectional inverter, wherein in a first state of the switching circuitry solely the first output is voltage free and the actuator input is active, resulting in the actuator being actuated, and thus the first normally closed contact is open, the second normally closed contact is open, and the normally open contact is closed; and wherein in a second, different state of the switching circuitry solely the actuator input is voltage free and the first output is active, resulting in the actuator being not actuated, and thus the first normally closed contact is closed, the second normally closed contact is closed, and the normally open contact is open.

16. The changeover device as claimed in claim 15, wherein the first normally closed contact and the second normally closed contact and the normally open contact are integrated in one switching circuit.

17. The changeover device as claimed in claim 15, further comprising energy supply connections configured to connect to a further energy source.

18. A retrofit kit for a system with feed lines to a load comprising a changeover device for selectively supplying power to at least one load from a grid or a bidirectional inverter, comprising:
    an input comprising a grid neutral conductor connection and a grid phase conductor connection, the input configured to connect to the grid;
    a first output comprising an inverter neutral conductor connection and an inverter phase conductor connection, the first output configured to connect to an inverter output of the bidirectional inverter;
    a second output comprising a load neutral conductor connection and a load phase conductor connection, the second output configured to connect to the load;
    a switching circuit, an actuator of which is connected to an actuator input of the changeover device, wherein the switching circuit comprises a first normally closed contact, a second normally closed contact, and a normally open contact, wherein the first normally closed contact has a first grid-side connection and a first inverter-side connection, the second normally closed contact has a second grid-side connection and a first load-side connection, and the normally open contact has a second inverter-side connection and a second load-side connection,
    wherein
    the grid phase conductor connection is connected to the first grid-side connection and the second grid-side connection,
    the inverter phase conductor connection is connected to the first inverter-side connection, and
    the load phase conductor connection is connected to the first load-side connection and the second load-side connection,
    wherein the system is upgraded to supply power to the load from the inverter in the event of a critical grid state by interposing the changeover device in the feed lines to the load and connecting a bidirectional inverter,
    wherein the changeover device additionally comprises a Secure Power Supply (SPS) connection having an SPS neutral conductor connection and an SPS phase conductor connection configured to connect to a Secure Power Supply (SPS) output of the bidirectional inverter
    wherein in an operating status of the changeover device only one of the first output and the actuator input is active and the other is voltage-free in response to switching circuitry within the bidirectional inverter,
    wherein in a first state of the switching circuitry solely the first output is voltage free and the actuator input is active, resulting in the actuator being actuated, and thus the first normally closed contact is open, the second normally closed contact is open, and the normally open contact is closed; and
    wherein in a second, different state of the switching circuitry solely the actuator input is voltage free and the first output is active, resulting in the actuator being not actuated, and thus the first normally closed contact is closed, the second normally closed contact is closed, and the normally open contact is open.

19. A method for changing over an energy supply for a load using a changeover device for selectively supplying power to at least one load from a grid or a bidirectional inverter, comprising:
    an input comprising a grid neutral conductor connection and a grid phase conductor connection, the input configured to connect to the grid;
    a first output comprising an inverter neutral conductor connection and an inverter phase conductor connection, the first output configured to connect to an inverter output of the bidirectional inverter;
    a second output comprising a load neutral conductor connection and a load phase conductor connection, the second output configured to connect to the load;
    a switching circuit, an actuator of which is connected to an actuator input of the changeover device, wherein the switching circuit comprises a first normally closed contact, a second normally closed contact, and a normally open contact, wherein the first normally closed contact has a first grid-side connection and a first inverter-side connection, the second normally closed contact has a second grid-side connection and a first load-side connection, and the normally open contact has a second inverter-side connection and a second load-side connection,
    wherein
    the grid phase conductor connection is connected to the first grid-side connection and the second grid-side connection,
    the inverter phase conductor connection is connected to the first inverter-side connection, and
    the load phase conductor connection is connected to the first load-side connection and the second load-side connection,
    wherein the connected bidirectional inverter ascertains a grid state and, in the event of a critical grid state, provides an actuation signal at the actuator input, with the result that the switching circuit is activated and, as a result, the first and second normally closed contacts are opened and the normally open contact is closed,
    wherein the changeover device additionally comprises a Secure Power Supply (SPS) connection having an SPS neutral conductor connection and an SPS phase conductor connection configured to connect to a Secure Power Supply (SPS) output of the bidirectional inverter, and
    wherein in an operating status of the changeover device only one of the first output and the actuator input is active and the other is voltage-free in response to switching circuitry within the bidirectional inverter,
    wherein in a first state of the switching circuitry solely the first output is voltage free and the actuator input is active, resulting in the actuator being actuated, and thus the first normally closed contact is open, the second normally closed contact is open, and the normally open contact is closed; and
    wherein in a second, different state of the switching circuitry solely the actuator input is voltage free and the first output is active, resulting in the actuator being not actuated, and thus the first normally closed contact is closed, the second normally closed contact is closed, and the normally open contact is open.

20. The method for changing over an energy supply for a load as claimed in claim 19, wherein a voltage supply for the actuator of the switching circuit is provided by way of the actuator signal.

* * * * *